(12) United States Patent
Zhang

(10) Patent No.: US 10,790,941 B2
(45) Date of Patent: Sep. 29, 2020

(54) METHOD AND DEVICE FOR NARROWBAND CELLULAR COMMUNICATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 129 days.

(21) Appl. No.: 16/301,432

(22) PCT Filed: Mar. 26, 2017

(86) PCT No.: PCT/CN2017/078240
§ 371 (c)(1),
(2) Date: Nov. 13, 2018

(87) PCT Pub. No.: WO2017/167142
PCT Pub. Date: Oct. 5, 2017

(65) Prior Publication Data
US 2019/0199483 A1   Jun. 27, 2019

(30) Foreign Application Priority Data
Apr. 1, 2016   (CN) .......................... 2016 1 0204323

(51) Int. Cl.
*H04L 1/00*   (2006.01)
*H04L 5/00*   (2006.01)
(Continued)

(52) U.S. Cl.
CPC .......... *H04L 1/1819* (2013.01); *H04L 1/0003* (2013.01); *H04L 5/0055* (2013.01);
(Continued)

(58) Field of Classification Search
CPC ......... H04W 72/0446; H04W 52/0225; H04W 76/048; H04L 5/0055
See application file for complete search history.

(56) References Cited

U.S. PATENT DOCUMENTS

2017/0215205 A1* 7/2017 Takeda ................... H04M 11/00
2018/0098322 A1* 4/2018 Yoon ................... H04W 72/042
2020/0084669 A1* 3/2020 Belleschi .......... H04W 72/1236

FOREIGN PATENT DOCUMENTS

| CN | 103906251 A | 7/2014 |
| CN | 105122932 A | 12/2015 |
| CN | 105453679 A | 3/2016 |

OTHER PUBLICATIONS

Qualcomm Incorporated et al., "New SI: Further Enhancements to LTE Device to Device, Lie to Network Relays for IOT and Wearables", 3GPPTSG RAN Meeting#71 RP-160677, Mar. 10, 2016 (Mar. 10, 2016), the whole document.

* cited by examiner

*Primary Examiner* — Iqbal Zaidi
(74) *Attorney, Agent, or Firm* — Maschoff Brennan

(57) ABSTRACT

The present disclosure provides a method and a device for narrowband cellular communication. A User Equipment (UE) first receives a first signaling, then receives a first radio signal in a first subframe group, and then transmits a second radio signal in a second subframe group, wherein the first subframe group comprises one or more subframes, and the second subframe group comprises one or more subframes. The first signaling is used for determining the first subframe group, and the first signaling is used for determining the second subframe group. The first radio signal is used for determining the second radio signal. A transmitter of the first radio signal is a first node, a receiver of the second radio signal includes a second node, and the first node and the (Continued)

second node are non-co-located. The present disclosure improves transmission efficiency, shortens transmission delay, and has good compatibility with existing products.

14 Claims, 12 Drawing Sheets

(51) Int. Cl.
*H04L 1/18* (2006.01)
*H04W 72/04* (2009.01)
*H04W 52/02* (2009.01)

(52) U.S. Cl.
CPC ....... *H04W 52/0216* (2013.01); *H04W 72/04* (2013.01); *H04W 72/0446* (2013.01); *Y02D 70/00* (2018.01)

METHOD AND DEVICE FOR NARROWBAND CELLULAR COMMUNICATION

BACKGROUND

Technical Field

The present disclosure relates to transmission schemes in wireless communication systems, and in particular to a method and a device supporting wireless relay transmissions.

Related Art

The 3rd Generation Partner Project Release 9 (3GPP R9) has put forward a scheme of Layer-3 relay station. The relay station, for User Equipment (UE), has the functions of common base stations and is capable of scheduling data independently and transmitting a downlink Hybrid Automatic Repeat reQuest Acknowledgement (HARQ-ACK).

In conventional 3GPP systems, data transmission occurs between a base station and a UE. D2D was approved and discussed in the 3GPP R12. The essential characteristic of the D2D is to allow data transmission between UEs. Enhancements to LTE Device to Device (eD2D) were approved in the 3GPP R13. The main characteristic of the eD2D is to introduce a UE relay function. In the eD2D, a relay UE relays data exchange between a remote UE and a base station.

At the 3GPP Radio Access Network (RAN) #69 plenary session, the NarrowBand Internet of Things (NB-IoT) was approved. The NB-IoT supports three different operating modes (RP-151621) as follows.

1. Stand-alone operating mode, deployed on a frequency spectrum used by a GERAN system.
2. Guard band operating mode, deployed on unused resource blocks in the guard band of Long Term Evolution (LTE) carriers.
3. In-band operating mode, deployed on resource blocks of LTE carriers.

Further, at the 3GPP RAN #71 plenary session, Further Enhancements to LTE Device to Device (FeD2D) for IoT and wearable devices were approved. In the FeD2D, the D2D communication may be realized through an aerial interface similar to the NB-IoT.

One typical application scenario of the FeD2D is that a plurality of wearable devices exist around a smart terminal. The smart terminal relays data exchange between the wearable device and a base station, that is to say, the smart terminal and the wearable device are a relay UE and a remote UE respectively.

SUMMARY

For the FeD2D, one intuitive solution is to reuse the scheme of relay station put forward in the 3GPP R9, that is, the relay UE has the functions of the relay station. However, the inventor finds through researches that the above intuitive method has very high requirements for the power consumption and the complexity of the smart terminal. Therefore, this method is difficult to implement. Another intuitive solution is to reuse the scheme of eD2D as much as possible, that is, both the relay UE and the remote UE transmit signalings and data by way of broadcasting. However, the inventor finds through researches that reusing the scheme of eD2D may increase the power consumption of the remote UE because the eD2D uses a Physical Sidelink Control Channel (PSCCH) period as a basic scheduling unit and does not support HARQ.

In view of the above problems, the present disclosure provides a solution. It should be noted that the embodiments of the present disclosure and the characteristics in the embodiments may be mutually combined if no conflict is incurred. For example, the embodiments in the UE of the present disclosure and the characteristics in the embodiments may be applied to the base station, and vice versa. For another example, the embodiments in the D2D transmitting UE (which transmits radio signals on a D2D link) of the present disclosure and the characteristics in the embodiments may be applied to the D2D receiving UE (which receives the radio signals on the D2D link), and vice versa. Further, although the present disclosure is originally designed for the FeD2D (that is, the D2D transmission is based on narrowband), the scheme of the present disclosure is also applicable to a wideband D2D relay (that is, the D2D transmission is based on wideband).

The present disclosure provides a method in a UE for relay communication, wherein the method includes:
   receiving a first signaling;
   receiving a first radio signal in a first subframe group; and
   transmitting a second radio signal in a second subframe group.

Herein, the first subframe group includes one or more subframes, and the second subframe group includes one or more subframes; the first signaling is used for determining the first subframe group, and the first signaling is used for determining the second subframe group; the first radio signal is used for determining the second radio signal; a transmitter of the first radio signal is a first node, a receiver of the second radio signal includes a second node, and the first node and the second node are non-co-located; and the second radio signal includes a first HARQ-ACK, and the first HARQ-ACK indicates whether the first radio signal is correctly decoded.

In one embodiment, the UE determines, according to the first signaling, a time domain position occupied by the first radio signal and a time domain position occupied by the second radio signal. The advantage of the present embodiment is that the overhead of signalings is saved, that is, the UE does not need to acquire the time domain position occupied by the first radio signal and the time domain position occupied by the second radio signal respectively through two signalings.

In one embodiment, the first node and the second node are a remote UE and a base station respectively. The difference between the above method and the present D2D/eD2D technology is that the first signaling can be used for determining both a downlink time domain resource and a PC5 (D2D link) time domain resource.

In one embodiment, the UE is a relay UE.

In one embodiment, the first radio signal occupies a bandwidth not greater than 180 kHz.

In one subembodiment, the bandwidth occupied by the first radio signal is one of 3.75 KHz, 15 KHz, 45 KHz, 90 KHz, and 180 KHz.

In one embodiment, the second radio signal occupies a bandwidth not less than 180 kHz.

In one subembodiment, the bandwidth occupied by the second radio signal is 180 kHz.

In one subembodiment, the bandwidth occupied by the second radio signal is a positive integer multiple of 180 kHz.

In one embodiment, the first subframe group occupies a time not less than 1 millisecond (ms).

In one subembodiment, the time occupied by the first subframe group is a positive integer number of milliseconds, and the positive integer number of milliseconds are consecutive.

In one subembodiment, the bandwidth occupied by the second radio signal is 3.75 KHz, and the time occupied by the first subframe group is P multiples of 8 ms, wherein the P is a positive integer.

In one subembodiment of the above subembodiment, P is 1.

In one subembodiment, the bandwidth occupied by the second radio signal is 15 KHz, and the time occupied by the first subframe group is Q multiples of 2 ms, wherein the Q is a positive integer.

In one subembodiment of the above subembodiment, Q is 1.

In one embodiment, the second subframe group occupies a time not greater than 1 ms.

In one subembodiment, the time occupied by the second subframe group is 1 ms.

In one embodiment, the bandwidth occupied by the second radio signal is greater than the bandwidth occupied by the first radio signal, and the time occupied by the second subframe group is less than the time occupied by the first subframe group.

In one embodiment, the first node and the second node being non-co-located refers that: the first node and the second node are two different communication devices.

In one embodiment, the first node and the second node being non-co-located refers that: there is not wired connection between the first node and the second node.

In one embodiment, the first node and the second node being non-co-located refers that: the first node and the second node are located at different sites.

In one embodiment, the first node is a terminal equipment, and the second node is a network side equipment.

In one embodiment, the second node is a maintenance equipment for a serving cell of the first node.

In one embodiment, the first signaling is a physical layer signaling.

In one embodiment, the first signaling is Downlink Control Information (DCI).

In one embodiment, the first signaling is Sidelink Control Information (SCI).

In one embodiment, a transmission channel corresponding to the first radio signal is a Sidelink Shared Channel (SL-SCH).

In one embodiment, the first radio signal being used for determining the second radio signal refers that: the second radio signal includes information acquired by the UE according to the first radio signal.

In one embodiment, the first radio signal being used for determining the second radio signal refers that: the second radio signal includes a first HARQ-ACK, and the first HARQ-ACK indicates whether the first radio signal is correctly decoded.

In one embodiment, in the above embodiment, the UE relays (through the second radio signal) the HARQ-ACK related to the uplink data transmitted by the first node to the second node; since the HARQ-ACK information needs few uplink resources and a previous uplink HARQ-ACK scheme probably may be reused, the HARQ-ACK information can be relayed previous to the first radio signal. The above embodiment enables the second node to determine as early as possible that the first radio signal is correctly decoded, and thus reduces the HARQ delay.

In one subembodiment, the first HARQ-ACK includes an information bit.

In one embodiment, the first radio signal being used for determining the second radio signal refers that: the second radio signal includes a signal obtained after the first radio signal is processed by channel equalization.

In one embodiment, the above embodiment is characterized in that the UE directly forwards (through the second radio signal) the received first radio signal to the second node. The implementation is simple.

In one embodiment, the first radio signal being used for determining the second radio signal refers that: the second radio signal includes information obtained after the first radio signal is processed by channel equalization and hard decision.

In one embodiment, the first radio signal being used for determining the second radio signal refers that: the second radio signal includes information obtained after the first radio signal is processed by channel decoding.

The above embodiment can bring performance gains of channel decoding.

According to one aspect of the present disclosure, the above method includes:
  receiving K radio signals in K subframe groups; and
  transmitting a third radio signal in a third subframe group.
  Herein, the K is a positive integer; the third subframe group includes one or more subframes; any one subframe group of the K subframe groups comprises one or more subframes; a transmitter of the K radio signals is the first node; and information bits corresponding to the third radio signal include at least one information bit corresponding to the first radio signal and at least one information bit corresponding to the K radio signals.

In one embodiment, in the above method, the UE combines multiple radio signals coming from the first node into the third radio signal to forward. A Transport Block Size (TBS) of the signal transmitted by the first node may be small and incompatible with a TBS of a conventional Physical Uplink Shared Channel (PUSCH). If the UE forwards each TBS of the first node, the overhead of scheduling signalings may be increased and more TBSs of PUSCHs may need to be defined. The above method improves the utilization of frequency band resources and keeps good compatibility with the present PUSCH.

In one embodiment, any one subframe group of the K subframe groups comprises one or more subframes.

In one embodiment, the number of subframes in each subframe group of the K subframe groups is Q1, and the number of subframes in the first subframe group is Q1. The Q1 is a positive integer.

In one embodiment, the above method includes:
  receiving a physical layer signaling in the third subframe group, wherein the physical layer signaling schedules the transmission of the third radio signal.

In one subembodiment, the physical layer signaling is an uplink grant DCI.

In one embodiment, the third radio signal occupies a bandwidth not less than 180 kHz.

In one embodiment, the start time of the third subframe group is behind the start time of the second subframe group.

In one embodiment, information bits corresponding to the third radio signal include a transport block corresponding to the first radio signal and K transport blocks, wherein the K transport blocks one-to-one correspond to the K radio signals respectively.

In one embodiment, the third radio signal is transmitted on a PUSCH.

In one embodiment, a transmission channel corresponding to the third radio signal is a UL-SCH.

In one embodiment, a transmission channel corresponding to the K radio signals is an SL-SCH.

According to one aspect of the present disclosure, the above method includes:

receiving a fourth radio signal in a fourth subframe group.

Herein, the fourth subframe group includes one or more subframes, the second radio signal includes the first HARQ-ACK and a second HARQ-ACK, and the second HARQ-ACK indicates whether the fourth radio signal is correctly decoded; and a transmitter of the fourth radio signal is an equipment other than the first node.

In one embodiment, the first node is a terminal equipment, a the transmitter of the fourth radio signal is a network side equipment.

In one embodiment, a transmitter of the fourth radio signal is a serving cell of the UE.

In one embodiment, the fourth radio signal is transmitted on a Physical Downlink Shared Channel (PDSCH).

In one embodiment, a transmission channel corresponding to the fourth radio signal is a Downlink Shared Channel (DL-SCH).

In one embodiment, the first HARQ-ACK and the second HARQ-ACK are indicated by different information bits in one Physical Uplink Control Channel (PUCCH) respectively.

In one embodiment, the second radio signal is transmitted on a PUCCH Format 3.

In one embodiment, the second radio signal is transmitted on a PUCCH Format 4.

In one embodiment, the second radio signal is transmitted on a PUCCH Format 5.

In one embodiment, the second radio signal is transmitted on a PUCCH Format 1A.

In one embodiment, the second radio signal is transmitted on a PUCCH Format 1B.

In one embodiment, in the above four embodiments, the UE may feedback the first HARQ-ACK using the present uplink HARQ-ACK scheme. The above method on one hand keeps good compatibility with existing systems, and on the other hand avoids the power limitation caused by transmitting two independent HARQ-ACKs.

In one subembodiment of the above four embodiments, the position of an information bit or information bits corresponding to the first HARQ-ACK in a bit sequence indicated by a PUCCH is configured by a higher layer signaling.

In one subembodiment of the above four embodiments, the position of an information bit or information bits corresponding to the first HARQ-ACK in a bit sequence indicated by a PUCCH is determined by default (that is, a configuration by a higher layer signaling is not needed).

In one embodiment, time-frequency resources occupied by the first HARQ-ACK and time-frequency resources occupied by the second HARQ-ACK are orthogonal in frequency domain.

In one subembodiment, in given time-frequency resources, the frequency domain position of frequency domain resources occupied by the first HARQ-ACK in the given time-frequency resources is fixed or is determined through a higher layer signaling, wherein the given time-frequency resources are time-frequency resources occupied by the second radio signal.

In one affiliated embodiment of the above subembodiment, the frequency domain positions refers to N subcarriers with lowest center frequencies in the given time-frequency resources, wherein N is a positive integer.

In one affiliated embodiment of the above subembodiment, the frequency domain positions refers to N subcarriers with highest center frequencies in the given time-frequency resources, wherein N is a positive integer.

In one embodiment, time-frequency resources occupied by the first HARQ-ACK and time-frequency resources occupied by the second HARQ-ACK are the same, the first HARQ-ACK and the second HARQ-ACK are indicated by a first Orthogonal Covering Code (OCC) and a second OCC respectively, and the first OCC is orthogonal to the second OCC.

According to one aspect of the present disclosure, the above method is characterized in that: the first signaling indicates explicitly at least one of the first subframe group and frequency domain resources occupied by the first radio signal in the first subframe group.

In one embodiment, the first signaling indicates a start subframe of the first subframe group and the number of subframes included in the first subframe group.

In one embodiment, the first signaling indicates at least one between a narrow band occupied by the first radio signal and a subcarrier occupied by the first radio signal in the narrow band.

In one subembodiment, the first signaling indicates, from a first narrow band set, a narrow band occupied by the first radio signal; and the first narrow band set includes Q narrow bands, wherein the Q is a positive integer. The narrow band corresponds to a bandwidth of one PRB, and any two narrow bands of the Q narrow bands are not overlapping in frequency domain.

In one embodiment of the first narrow band set, the first narrow band set corresponds to a system bandwidth of an uplink carrier of a serving cell of the UE.

In one embodiment of the first narrow band set, the first narrow band set corresponds to a portion of a system bandwidth of an uplink carrier of a serving cell of the UE.

In one embodiment of the Q narrow bands, the Q narrow bands correspond to Q PRBs respectively, and the Q PRBs are discrete in frequency domain.

In one embodiment of the Q narrow bands, the Q narrow bands correspond to Q PRBs respectively, and the Q PRBs are consecutive in frequency domain.

In one embodiment of the Q narrow bands, the Q narrow bands correspond to Q PRBs respectively, and the positions of the Q PRBs in an uplink system bandwidth of a serving cell of the UE are fixed.

In one embodiment of the Q narrow bands, the Q narrow bands correspond to Q PRBs respectively, and the positions of the Q PRBs in an uplink system bandwidth of a serving cell of the UE are configured by a higher layer signaling.

In one embodiment, the subcarrier or subcarrier group occupied by the first radio signal in the narrow band is one among one 3.75 kHz subcarrier, one 15 kHz subcarrier, three 15 kHz subcarriers, six 15 kHz subcarriers and twelve 15 kHz subcarriers.

In one embodiment, the subcarriers occupied by the first radio signal in the narrow band are consecutive in frequency domain.

According to one aspect of the present disclosure, the above method is characterized in that: the first signaling indicates implicitly at least one of the second subframe group and frequency domain resources occupied by the second radio signal in the second subframe group.

In one embodiment, the above method can save the scheduling information for the second radio signal, reduce the overhead of control signalings, and improve the spectrum utilization.

In one embodiment, the second subframe group occupies one subframe only.

In one embodiment, a start subframe of the second subframe group is related to a start subframe of the first subframe group.

In one subembodiment, if the UE starts receiving the first radio signal in the Nth subframe, the UE starts transmitting the second radio signal in the (N+N2)th subframe, wherein the N is a positive integer, and the N2 is a predefined positive integer which is not less than 4.

In one embodiment of the N2, the N2 is related to a bandwidth occupied by the first radio signal. In one subembodiment, the bandwidth occupied by the first radio signal is 3.75 KHz, and the N2 is 40. In an example of the affiliated embodiment, the bandwidth occupied by the first radio signal is 15 KHz, and the N2 is 16. In an example of the affiliated embodiment, the bandwidth occupied by the first radio signal is greater than 15 KHz, and the N2 is 8.

In one embodiment, a start subframe of the second subframe group is related to an end subframe of the first subframe group.

In one subembodiment, a last subframe occupied by the first radio signal is the nth subframe, and the UE starts transmitting the second radio signal in the (n+n2)th subframe, wherein the n is a positive integer, and the n2 is a predefined positive integer which is not less than 4.

In one embodiment of the n2, the n2 is a constant.

In one embodiment of the n2, the n2 is related to a bandwidth occupied by the first radio signal.

In one subembodiment, the bandwidth occupied by the first radio signal is 3.75 KHz, and the n2 is 12.

In one subembodiment, the bandwidth occupied by the first radio signal is 15 KHz, and the n2 is 8.

In one subembodiment, the bandwidth occupied by the first radio signal is greater than 15 KHz, and the n2 is 4.

In one embodiment, the first signaling indicates implicitly frequency domain resources occupied by the second radio signal in the second subframe group, that is, the frequency domain resources occupied by the second radio signal in the second subframe group is related to the frequency domain resource occupied by the first radio signal in the first subframe group.

In one subembodiment, the position(s) of the PRB(s) occupied by the second radio signal in the second subframe group in the uplink system bandwidth is(are) the same as the position(s) of the PRB(s) occupied by the first radio signal in the first subframe group in the uplink system bandwidth.

In one embodiment, the first signaling indicating implicitly frequency domain resources occupied by the second radio signal in the second subframe group refers that: the frequency domain resources occupied by the second radio signal in the second subframe group are predefined.

In one subembodiment, the frequency domain resources occupied by the second radio signal in the second subframe group are in one PRB, and the PRB is a PRB with a lowest center frequency in the uplink system bandwidth.

In one subembodiment, the frequency domain resources occupied by the second radio signal in the second subframe group are in one PRB, and the PRB is a PRB with a highest center frequency in the uplink system bandwidth.

According to one aspect of the present disclosure, the above method is characterized in that: the first signaling is used for determining a first subframe pool; the first subframe pool includes a positive integer number of subframes; and the subframes in the first subframe group all belong to the first subframe pool, and the positions of the subframes contained in the first subframe group in the first subframe pool are predefined (that is, an explicit configuration by the first signaling is not needed).

In one embodiment, the first subframe pool includes I subframe subsets, and the I subframe subsets are discrete in time domain. Any subframe subset of the I subframe subsets includes J consecutive subframe groups. Adjacent subframe subsets of the I subframe subsets are spaced apart by L subframes. The I is a positive integer, the J is a positive integer greater than 1, and the L is a positive integer not less than 6.

In one subembodiment, the J is related to the bandwidth occupied by the first radio signal.

In one embodiment, the above subembodiment is characterized in that: the J is determined according to the bandwidth occupied by the first radio signal. Uplink resources for the remote UE and the relay UE may be reasonably allocated, and the spectrum efficiency may be improved.

In one affiliated embodiment of the above subembodiment, the bandwidth occupied by the first radio signal is 3.75 KHz, and the J is not less than 32.

In one affiliated embodiment of the above subembodiment, the bandwidth occupied by the first radio signal is 15 KHz, and the J is not less than 8.

In an example of the affiliated embodiment, the bandwidth occupied by the first radio signal is greater than 15 KHz, and the J is not less than 1.

In one embodiment, the subframes contained in the second subframe group are subframes other than the subframes contained in the first subframe pool.

The present disclosure provides a method in a UE for relay communication, wherein the method includes:

receiving a first signaling, or transmitting a first signaling, or receiving a second signaling; and transmitting a first radio signal in a first subframe group.

Herein, the first subframe group includes one or more subframes, and the second subframe group includes one or more subframes; and the first radio signal is used for determining the second radio signal. The second radio signal is transmitted in the second subframe group; the UE is a first node, a receiver of the second radio signal includes a second node, and the first node and the second node are non-co-located; a transmitter of the second radio signal is a receiver of the first radio signal; and the second radio signal includes a first HARQ-ACK, and the first HARQ-ACK indicates whether the first radio signal is correctly decoded.

According to one aspect of the present disclosure, the above method is characterized in that: the UE receives the first signaling; and the first signaling is used for determining the first subframe group, and the first signaling is used for determining the second subframe group.

In one embodiment, in the above method, the remote UE and the relay UE share the first signaling, thus the overhead of controlling signalings is saved.

According to one aspect of the present disclosure, the above method is characterized in that: the UE receives the second signaling; and the second signaling is used for determining the first subframe group, and the second signaling is used for determining the second subframe group.

In one embodiment, in the above method, scheduling information of the first radio signal for the remote UE comes from the second signaling, and scheduling information of the first radio signal for the relay UE comes from the first signaling; in this way, the first signaling and the second signaling may employ conventional DCI designs, and no extra protocol change is needed.

In one embodiment, the second signaling indicates explicitly at least one between the first subframe group and frequency domain resources occupied by the first radio signal in the first subframe group.

In one embodiment, the second signaling indicates implicitly at least one between the second subframe group and frequency domain resources occupied by the second radio signal in the second subframe group.

In one embodiment, the second signaling is a physical layer signaling.

In one embodiment, the second signaling is a DCI.

In one embodiment, the second signaling is an SCI.

According to one aspect of the present disclosure, the above method is characterized in that: the UE transmits the first signaling; and the first signaling is used for determining the first subframe group, and the first signaling is used for determining the second subframe group.

According to one aspect of the present disclosure, the above method is characterized in that:

receiving a third signaling.

Herein, the UE transmits the first signaling; the third signaling includes scheduling information, and the first signaling includes the scheduling information included in the third signaling; and the scheduling information includes at least one among information relevant to the first subframe group, a frequency domain resource occupied by the first radio signal in the first subframe group, an MCS (Modulation Coding Scheme) for the first radio signal, an RV (Redundancy Version) for the first radio signal, a HARQ (Hybrid Automatic Repeat reQuest) process number for the first radio signal, and an NDI (New Data Indicator) for the first radio signal.

In one embodiment, in the above aspect, scheduling information of the first radio signal for the remote UE comes from the third signaling, and the remote UE transmits the scheduling information of the first radio signal to the relay UE through the first signaling. The third signaling is similar to a DCI Format 5 in conventional D2D communications, and the first signaling is similar to an SCI in D2D communications. This method does not need to change the design of the present D2D, and the protocol change is small.

In one embodiment, the first signaling is an SCI.

In one embodiment, the third signaling is a DCI.

In one subembodiment, a format employed by the DCI is a DCI Format 5.

According to one aspect of the present disclosure, the above method includes:

transmitting K radio signals in K subframe groups.

Herein, the K is a positive integer; any one subframe group of the K subframe groups comprises one or more subframes; at least one information bit corresponding to the first radio signal and at least one information bit corresponding to the K radio signals are mapped to a third radio signal; the third radio signal is transmitted in a third subframe group; and a transmitter of the third radio signal is a receiver of the K radio signals.

In one embodiment, a receiver of the K radio signals is the second node.

According to one aspect of the present disclosure, the above method includes:

receiving a fourth signaling, and determining whether the first radio signal is correctly decoded according to the fourth signaling.

Herein, receiving start time of the fourth signaling is behind transmitting end time of the first radio signal, and the fourth signaling includes a HARQ-ACK for the first radio signal; or the fourth signaling includes at least a first ID between a first ID and the HARQ process number for the first radio signal, and the first ID indicates whether data scheduled by the fourth signaling is new data; and a transmitter of the fourth signaling and the receiver of the first radio signal are non-co-located.

In one embodiment, the transmitter of the fourth signaling is a serving cell of the UE.

In one embodiment, the first ID is an NDI.

In one embodiment, the fourth signaling includes an ACK for the first radio signal, and the UE assumes that the first radio signal is correctly decoded; or, the fourth signaling includes a NACK for the first radio signal, and the UE assumes that the first radio signal is not correctly decoded.

In one embodiment, the fourth signaling includes the first ID. The first ID indicates new data, and the UE assumes that the first radio signal is correctly decoded; or, the first ID indicates old data, and the UE assumes that the first radio signal is not correctly decoded.

In one embodiment, assuming that the first radio signal is correctly decoded refers that: an information bit corresponding to the first radio signal is dropped.

In one embodiment, assuming that the first radio signal is not correctly decoded refers that: (a transport block corresponding to the first radio signal) has not been retransmitted for M times, and the information bit corresponding to the first radio signal is buffered; or, (a transport block corresponding to the first radio signal) has not been retransmitted for M times, and the information bit corresponding to the first radio signal is dropped. The M is a maximum number of times of retransmission. In one subembodiment, the M is a constant. In one subembodiment, the M is a positive integer greater than 1. In one subembodiment, the M is 3.

The present disclosure provides a method in a base station for relay communication, wherein the method includes:

transmitting a first signaling, wherein the first signaling is used for determining a first subframe group, and the first signaling is used for determining a second subframe group; or transmitting a second signaling, wherein the second signaling is used for determining a first subframe group, and the second signaling is used for determining a second subframe group; or transmitting a third signaling, wherein the third signaling includes scheduling information, and the first signaling includes the scheduling information included in the third signaling; and receiving a second radio signal in the second subframe group.

Herein, the first subframe group includes one or more subframes, and the second subframe group includes one or more subframes; the second radio signal is related to a first radio signal; the first radio signal is transmitted in the first subframe group; a transmitter of the first radio signal is a first node, the base station is a second node, and the first node and the second node are non-co-located; the scheduling information includes at least one among information relevant to the first subframe group, frequency domain resources occupied by the first radio signal in the first subframe group, an MCS for the first radio signal, an RV for the first radio signal, a HARQ process number for the first radio signal, and an NDI for the first radio signal; and the second radio signal includes a first HARQ-ACK, and the first HARQ-ACK indicates whether the first radio signal is correctly decoded.

According to one aspect of the present disclosure, the above method includes:

receiving a third radio signal in a third subframe group.

Herein, the third subframe group includes one or more subframes, information bits corresponding to the third radio signal include at least one information bit corresponding to the first radio signal and at least one information bit corresponding to K radio signals; the K radio signals are transmitted in K subframe groups respectively; the K is a positive integer; and a transmitter of the K radio signal is the first node.

In one embodiment, the above method includes:

transmitting a physical layer signaling in a third subframe group, wherein the physical layer signaling schedules the transmission of the third radio signal.

In one subembodiment, the physical layer signaling is a grant DCI.

According to one aspect of the present disclosure, the above method includes:

transmitting a fourth radio signal in a fourth subframe group.

Herein, the fourth subframe group includes one or more subframes, the second radio signal includes the first HARQ-ACK and a second HARQ-ACK, and the second HARQ-ACK indicates whether the fourth radio signal is correctly decoded.

According to one aspect of the present disclosure, the above method includes:

transmitting a fourth signaling.

Herein, the second radio signal is used for determining the fourth signaling; receiving start time of the fourth signaling is behind transmitting end time of the first radio signal; the fourth signaling includes a HARQ-ACK for the first radio signal; or the fourth signaling includes at least a first ID between a first ID and a HARQ process number for the first radio signal, and the first ID indicates whether data scheduled by the fourth signaling is new data; and the base station and a receiver of the first radio signal are non-co-located.

In one embodiment, the first HARQ-ACK indicates that the first radio signal is correctly decoded, and the fourth signaling includes an ACK for the first radio signal; or, the first HARQ-ACK indicates that the first radio signal is not correctly decoded, and the fourth signaling includes a NACK for the first radio signal.

In one embodiment, the fourth signaling includes the first ID. The first HARQ-ACK indicates that the first radio signal is correctly decoded, and the first ID indicates new data; or, (a transport block corresponding to the first radio signal) has not been retransmitted for M times and the first HARQ-ACK indicates that the first radio signal is not correctly decoded, the first ID indicates old data; or, (a transport block corresponding to the first radio signal) has been retransmitted for M times and the first HARQ-ACK indicates that the first radio signal is not correctly decoded, the first ID indicates new data. The M is a maximum number of times of retransmission.

According to one aspect of the present disclosure, the above method is characterized in that: the first signaling indicates implicitly at least one of the second subframe group and frequency domain resources occupied by the second radio signal in the second subframe group.

The present disclosure provides a UE for relay communication, wherein the UE includes:

a first receiver, receiving a first signaling;

a second receiver, receiving a first radio signal in a first subframe group; and a first transmitter, transmitting a second radio signal in a second subframe group.

Herein, the first subframe group includes one or more subframes, and the second subframe group includes one or more subframes; the first signaling is used for determining the first subframe group, and the first signaling is used for determining the second subframe group; the first radio signal is used for determining the second radio signal; a transmitter of the first radio signal is a first node, a receiver of the second radio signal includes a second node, and the first node and the second node are non-co-located; and the second radio signal includes a first HARQ-ACK, and the first HARQ-ACK indicates whether the first radio signal is correctly decoded.

In one embodiment, the above UE is characterized in that: the second receiver further receives K radio signals in K subframe groups, and the first transmitter further transmits a third radio signal in a third subframe group; the K is a positive integer; the third subframe group includes one or more subframes; any one subframe group of the K subframe groups comprises one or more subframes; a transmitter of the K radio signals is the first node; and information bits corresponding to the third radio signal include at least one information bit corresponding to the first radio signal and at least one information bit corresponding to the K radio signals.

In one embodiment, the above UE is characterized in that: the first transmitter further transmits a third radio signal in a third subframe group; the third subframe group includes one or more subframes; and information bits corresponding to the third radio signal include at least one information bit corresponding to the first radio signal and at least one information bit corresponding to the K radio signals.

In one embodiment, the above UE is characterized in that: the first receiver further receives a fourth radio signal in a fourth subframe group; the fourth subframe group includes one or more subframes, the second radio signal includes the first HARQ-ACK and a second HARQ-ACK, and the second HARQ-ACK indicates whether the fourth radio signal is correctly decoded; and a transmitter of the fourth radio signal is an equipment other than the first node.

In one embodiment, the above UE is characterized in that: the first signaling indicates explicitly at least one of the first subframe group and frequency domain resources occupied by the first radio signal in the first subframe group.

In one embodiment, the above UE is characterized in that: the first signaling indicates implicitly at least one of the second subframe group and frequency domain resources occupied by the second radio signal in the second subframe group.

In one embodiment, the above UE is characterized in that: the first signaling is used for determining a first subframe pool, the first subframe pool includes a positive integer number of subframes, the subframes in the first subframe group all belong to the first subframe pool, and the positions of the subframes contained in the first subframe group in the first subframe pool are predefined.

The present disclosure provides a UE for relay communication, wherein the UE includes:

a first transceiver, receiving a first signaling, or transmitting a first signaling, or receiving a second signaling; and a second transmitter, transmitting a first radio signal in a first subframe group.

Herein, the first subframe group includes one or more subframes, and the second subframe group includes one or more subframes; the first signaling is used for determining the first subframe group, and the first signaling is used for determining the second subframe group; the second signaling is used for determining the first subframe group, and the second signaling is used for determining the second subframe group; the first radio signal is used for determining the second radio signal; the second radio signal is transmitted in the second subframe group; the UE is a first node, a receiver of the second radio signal includes a second node, and the first node and the second node are non-co-located; a transmitter of the second radio signal is a receiver of the first radio signal; and the second radio signal includes a first HARQ-ACK, and the first HARQ-ACK indicates whether the first radio signal is correctly decoded.

In one embodiment, the above UE is characterized in that: the first transceiver further receives a third signaling; the first transmitter transmits the first signaling; the third signaling includes scheduling information, and the first signaling includes the scheduling information included in the third signaling; and the scheduling information includes at least one among information relevant to the first subframe group, a frequency domain resource occupied by the first radio signal in the first subframe group, an MCS for the first radio signal, an RV for the first radio signal, a HARQ process number for the first radio signal, and an NDI for the first radio signal.

In one embodiment, the above UE is characterized in that: the second transmitter further transmits K radio signals in K subframe groups; the K is a positive integer; any one subframe group of the K subframe groups comprises one or more subframes; at least one information bit corresponding to the first radio signal and at least one information bit corresponding to the K radio signals are mapped to a third radio signal; the third radio signal is transmitted in a third subframe group; and a transmitter of the third radio signal is a receiver of the K radio signals.

In one embodiment, the above UE further includes:

a third receiver, receiving a fourth signaling, and determining whether the first radio signal is correctly decoded according to the fourth signaling.

Herein, receiving start time of the fourth signaling is behind transmitting end time of the first radio signal, and the fourth signaling includes a HARQ-ACK for the first radio signal; or the fourth signaling includes at least a first ID between a first ID and a HARQ process number for the first radio signal, and the first ID indicates whether data scheduled by the fourth signaling is new data; and a transmitter of the fourth signaling and the receiver of the first radio signal are non-co-located.

In one embodiment, the above UE is characterized in that: the first signaling is used for determining a first subframe pool; the first subframe pool includes a positive integer number of subframes; and the subframes in the first subframe group all belong to the first subframe pool, and the positions of the subframes contained in the first subframe group in the first subframe pool are predefined.

The present disclosure provides a base station device for relay communication, wherein the base station device includes:

a third transmitter, transmitting a first signaling, wherein the first signaling is used for determining a first subframe group, and the first signaling is used for determining a second subframe group; or to transmit a second signaling, wherein the second signaling is used for determining a first subframe group, and the second signaling is used for determining a second subframe group; or to transmit a third signaling, wherein the third signaling includes scheduling information, and the first signaling includes the scheduling information included in the third signaling; and a second transceiver, receiving a second radio signal in the second subframe group.

Herein, the first subframe group includes one or more subframes, and the second subframe group includes one or more subframes; the second radio signal is related to a first radio signal; the first radio signal is transmitted in the first subframe group; a transmitter of the first radio signal is a first node, the base station is a second node, and the first node and the second node are non-co-located; the scheduling information includes at least one among information relevant to the first subframe group, a frequency domain resource occupied by the first radio signal in the first subframe group, an MCS for the first radio signal, an RV for the first radio signal, a HARQ process number for the first radio signal, and an NDI for the first radio signal; and the second radio signal includes a first HARQ-ACK, and the first HARQ-ACK indicates whether the first radio signal is correctly decoded.

In one embodiment, the above base station device is characterized in that: the second transceiver further receives a third radio signal in a third subframe group; the third subframe group includes one or more subframes, information bits corresponding to the third radio signal include at least one information bit corresponding to the first radio signal and at least one information bit corresponding to K radio signals; the K radio signals are transmitted in K subframe groups respectively; the K is a positive integer; and a transmitter of the K radio signal is the first node.

In one embodiment, the above base station device is characterized in that: the second transceiver further transmits a fourth radio signal in a fourth subframe group; the fourth subframe group includes one or more subframes; and the second radio signal includes the first HARQ-ACK and a second HARQ-ACK, and the second HARQ-ACK indicates whether the fourth radio signal is correctly decoded.

In one embodiment, the above base station device includes:

a fourth transmitter, transmitting a fourth signaling.

Herein, the second radio signal is used for determining the fourth signaling; receiving start time of the fourth signaling is behind the transmitting end time of the first radio signal; the fourth signaling includes a HARQ-ACK for the first radio signal; or the fourth signaling includes at least a first ID of the first ID and the HARQ process number for the first radio signal, and the first ID indicates whether data scheduled by the fourth signaling is new data; and the base station and a receiver of the first radio signal are non-co-located.

In one embodiment, the above base station device is characterized in that: the first signaling indicates implicitly at least one of the second subframe group and frequency resources occupied by the second radio signal in the second subframe group.

In one embodiment, the above base station device is characterized in that: the first signaling is used for determining a first subframe pool; the first subframe pool includes a positive integer number of subframes; and the subframes in the first subframe group all belong to the first subframe pool, and the positions of the subframes contained in the first subframe group in the first subframe pool are predefined.

In one embodiment, compared with existing published technologies, the present disclosure has the following technical advantages.

Through the designs of the first signaling, the first radio signal and the second radio signal, the uplink data of the remote UE is forwarded, through the relay UE, to the base station. The power consumption of the remote UE is reduced, and the working time of the remote UE is prolonged.

The uplink data of the remote UE is transmitted in advance to the base station, so as to reduce the relay delay caused by the relay UE.

Through the second radio signal including the HARQ-ACK corresponding to the fourth radio signal, the uplink HARQ-ACK of the relay UE and the uplink HARQ-ACK of the remote UE are transmitted on one same time-frequency resource. The uplink spectrum utilization is improved.

Through the design of the third radio signal, multiple transport blocks coming from the remote UE are combined to transmit. The uplink spectrum utilization is further improved.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments in the present disclosure and the characteristics of the embodiments may be arbitrarily combined if no conflict is caused.

Embodiment 1

Figure 1:
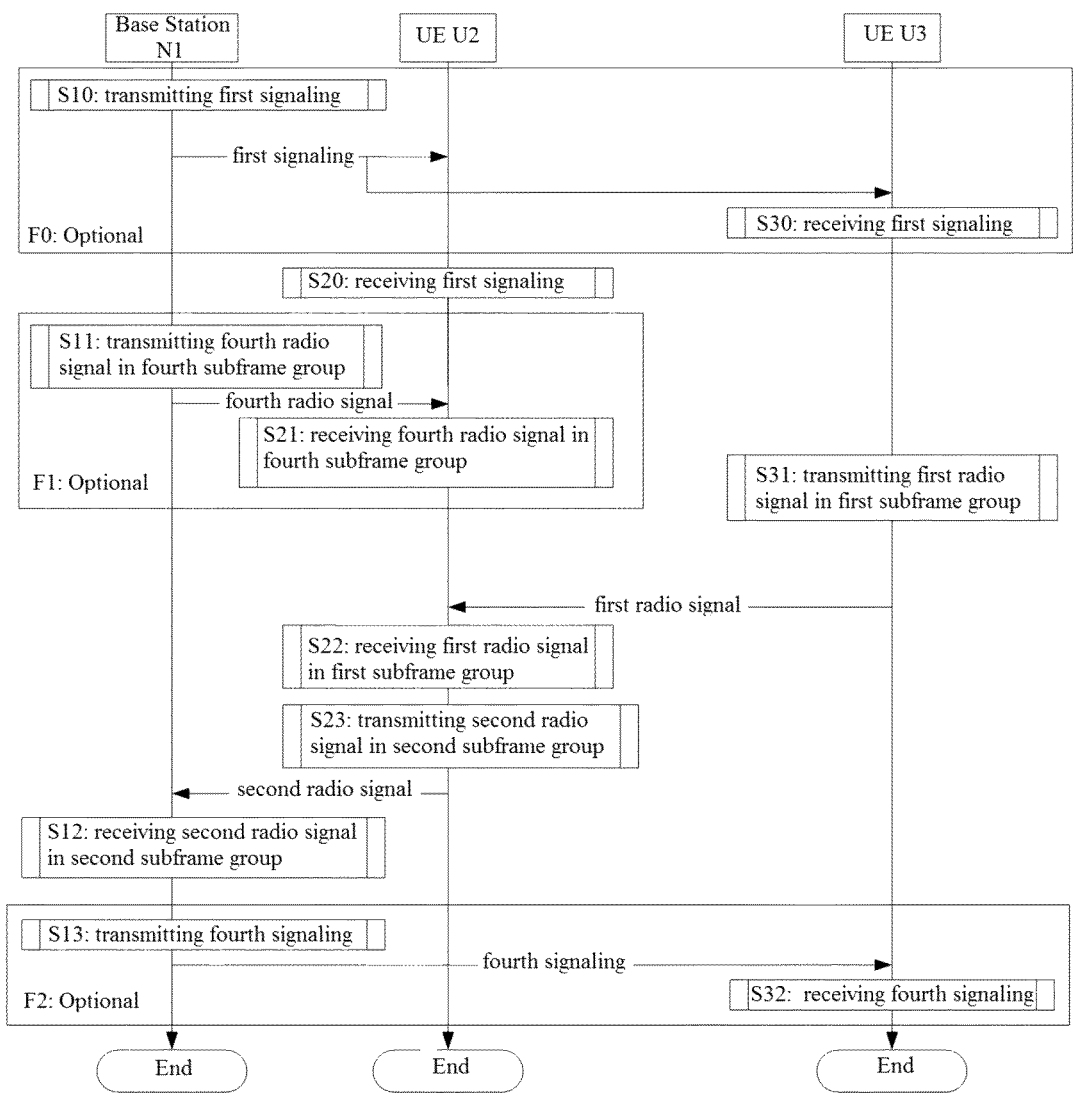
FIG. 1 is a flowchart of relay transmission according to one embodiment of the present disclosure.

Embodiment 1 illustrates an example of a flowchart of relay transmission, as shown in FIG. 1. In FIG. 1, the base station N1 is a maintenance base station for a serving cell of the UE U2, the base station N1 is also a maintenance base station for a serving cell of the UE U3, and steps marked in boxes F0 to F2 are optional.

The base station N1 transmits a first signaling in S10, transmits a fourth radio signal in a fourth subframe group in S11, receives a second radio signal in a second subframe group in S12, and transmits a fourth signaling in S13.

The UE U2 receives the first signaling in S20, receives the fourth radio signal in the fourth subframe group in S21, receives a first radio signal in a first subframe group in S22, and transmits the second radio signal in the second subframe group in S23.

The UE U3 receives the first signaling in S30, transmits the first radio signal in the first subframe group in S31, and receives the fourth signaling in S32.

In Embodiment 3, the first subframe group comprises one or more subframes, and the second subframe group comprises one or more subframes; the first signaling is used for determining the first subframe group, and the first signaling is used for determining the second subframe group; the first radio signal is used for determining the second radio signal; the UE U3 and the base station N1 are non-co-located; and the second radio signal comprises a first HARQ-ACK, and the first HARQ-ACK indicates whether the first radio signal is correctly decoded; the fourth subframe group comprises one or more subframes, the second radio signal comprises the first HARQ-ACK and a second HARQ-ACK, and the second HARQ-ACK indicates whether the fourth radio signal is correctly decoded.

In one subembodiment, the second radio signal employs a PUCCH transmitted by a PUCCH Format 1/1a/1b.

In one subembodiment, a PUCCH resource index of the first HARQ-ACK in the second radio signal is related to a lowest (Control Channel Element) CCE index in the CCEs constituting the first signaling, wherein the first signaling is a Physical Downlink Control Channel (PDCCH).

In one subembodiment, a PUCCH resource index of the first HARQ-ACK in the second radio signal is related to a lowest (Enhanced Control Channel Element) ECCE index occupied by the ECCEs constituting the first signaling, wherein the first signaling is an Enhanced Physical Downlink Control Channel (EPDCCH).

Embodiment 2

Figure 2:
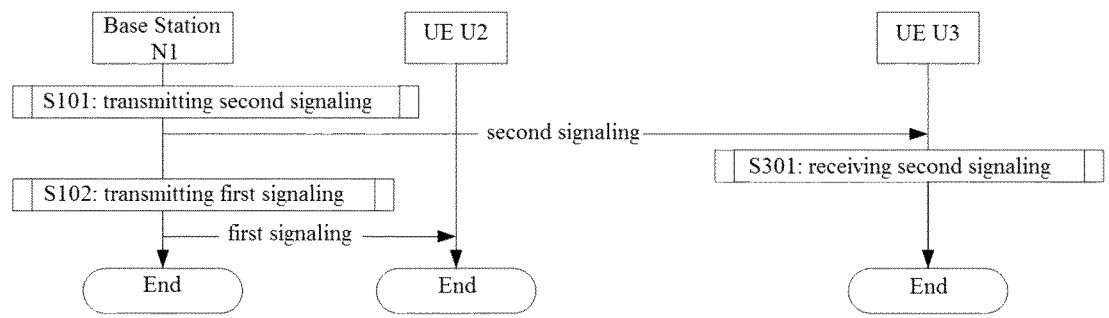
FIG. 2 is a flowchart of the transmission of a second signaling according to one embodiment of the present disclosure.

Embodiment 2 illustrates an example of a flowchart of the transmission of a second signaling, as shown in FIG. 2. In FIG. 2, the base station N1 is a maintenance base station for a serving cell of the UE U2, and the base station N1 is also a maintenance base station for a serving cell of the UE U3.

The base station N1 transmits a second signaling in S101, and transmits a first signaling in S102.

The UE U3 receives the second signaling in S301.

In Embodiment 2, the first signaling is used by the UE U2 to determine the first subframe group and the second subframe group. The second signaling is used by the UE U3 to determine the first subframe group and the second subframe group.

In one subembodiment, the first signaling and the second signaling are DCIs respectively.

In one subembodiment, the steps shown in FIG. 2 represent the steps marked by F0 shown in FIG. 1.

Embodiment 3

Figure 3:
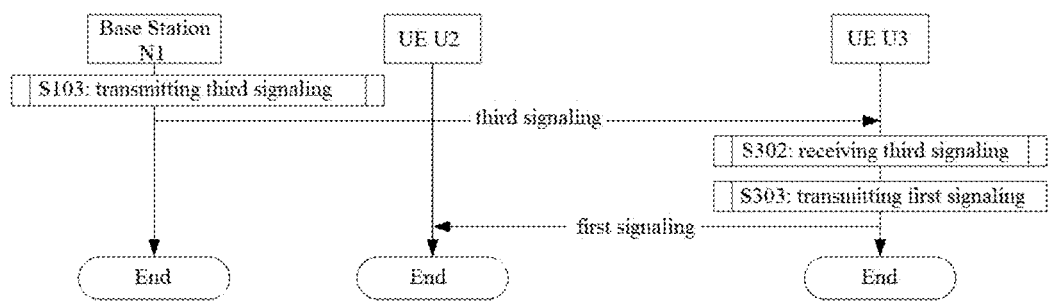
FIG. 3 is a flowchart of the transmission of a third signaling according to one embodiment of the present disclosure.

Embodiment 3 illustrates an example of a flowchart of the transmission of a third signaling, as shown in FIG. 3. In FIG.

3, the base station N1 is a maintenance base station for a serving cell of the UE U2, and the base station N1 is also a maintenance base station for a serving cell of the UE U3.

The base station N1 transmits a third signaling in S103.

The UE U3 receives the third signaling in S302, and transmits a first signaling in S303.

In Embodiment 3, the third signaling comprises scheduling information, and the first signaling comprises the scheduling information included in the third signaling; and the scheduling information comprises at least one among information relevant to the first subframe group, frequency domain resources occupied by the first radio signal in the first subframe group, a Modulation and Coding Scheme of the first radio signal, a Redundancy Version of the first radio signal, a HARQ process number for the first radio signal, and a New Data Indicator for the first radio signal.

In one embodiment, the second radio signal employs a PUCCH transmitted by a PUCCH Format 1/1a/1b.

In one subembodiment, a PUCCH resource index of the first HARQ-ACK in the second radio signal is determined by the first signaling.

In one affiliated embodiment of the above subembodiment, the first signaling includes an information unit Z, wherein the Z is a non-negative integer, and the Z is the PUCCH resource index of the first HARQ-ACK in the second radio signal.

In one subembodiment, the steps shown in FIG. 3 represent the steps marked by F0 shown in FIG. 1.

Embodiment 4

Figure 4:
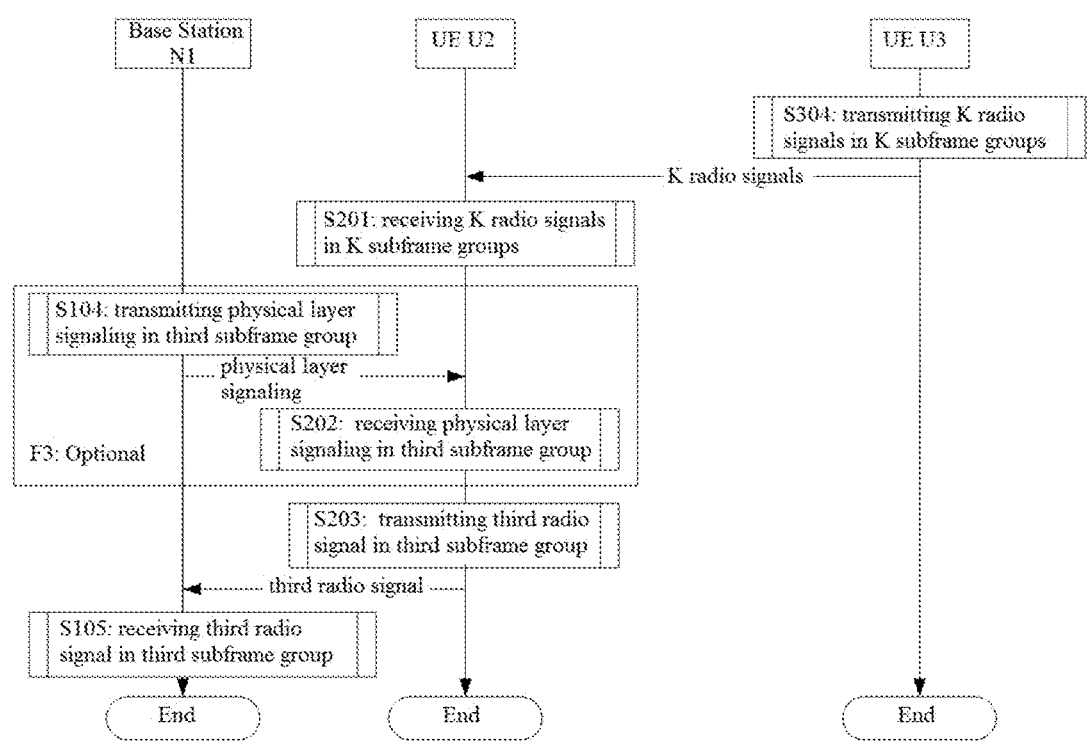
FIG. 4 is a flowchart of the transmission of a third radio signal according to one embodiment of the present disclosure.

Embodiment 4 illustrates an example of a flowchart of the transmission of a third radio signal, as shown in FIG. 4. In FIG. 4, the base station N1 is a maintenance base station for a serving cell of the UE U2, the base station N1 is also a maintenance base station for a serving cell of the UE U3, and steps in box F3 are optional.

The base station N1 transmits a physical layer signaling in a third subframe group in S104, and receives a third radio signal in the third subframe group in S105.

The UE U2 receives K radio signal in K subframe groups in S201, receives the physical layer signaling in the third subframe group in S202, and transmits the third radio signal in the third subframe group in S203.

The UE U3 transmits the K radio signals in the K subframe groups in S304.

In Embodiment 4, the K is a positive integer, the third subframe group comprises one or more subframes, any one subframe group of the K subframe groups comprises one or more subframes; information bits corresponding to the third radio signal comprise at least one information bit corresponding to the first radio signal and at least one information bit corresponding to the K radio signals; the physical layer signaling schedules the transmission of the third radio signal.

Embodiment 5

Figure 5:
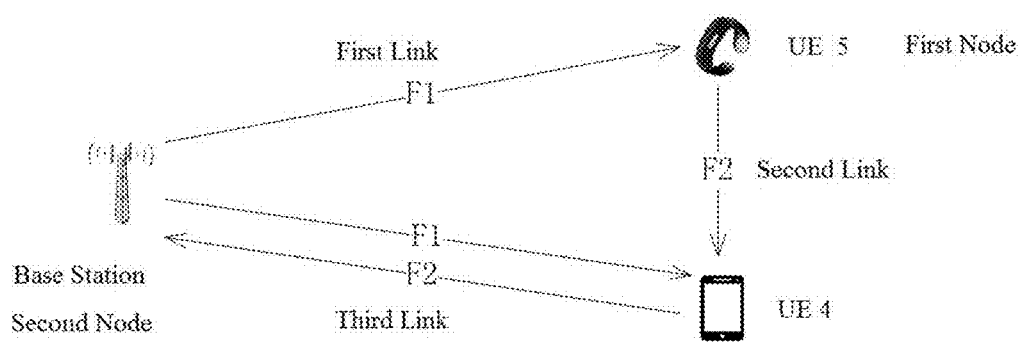
FIG. 5 is a diagram illustrating the distribution of a first node and a second node according to one embodiment of the present disclosure.

Embodiment 5 illustrates an example of a diagram of the distribution of a first node and a second node, as shown in FIG. 5. In FIG. 5, the first node is a UE5, the second node is a base station, a radio link between the base station and the UE5 is a first link, a radio link between the UE5 and a U4 is a second link, and a link between the UE4 and the base station is a third link. The first link is a unidirectional link, through which only the transmission from the base station to the UE5 is available; and a frequency band occupied by the first link is F1. The second link is a unidirectional link, through which only the transmission from the UE5 to the UE4 is available; and a frequency band occupied by the second link is F2. The third link is a bidirectional link. A frequency band occupied by the transmission from the base station to the UE4 is F1, and a frequency band occupied by the transmission from the UE4 to the base station is F2.

In one subembodiment, the transmission from the base station to the UE4 employs a Time Division Duplexing (TDD) mode; F1 and F2 are one same frequency band.

In one subembodiment, the transmission from the base station to the UE4 employs a Frequency Division Duplexing (FDD) mode; F1 and F2 are different frequency bands.

In one subembodiment, the UE5 is a wearable device.

In one subembodiment, the UE4 is a smart terminal.

In one subembodiment, the first signaling is transmitted on the F1 of the first link, and the first signaling is further transmitted on the F1 of the third link.

In one subembodiment, the second signaling is transmitted on the F1 of the first link, and the first signaling is further transmitted on the F1 of the third link.

In one subembodiment, the third signaling is transmitted on the F1 of the first link, and the first signaling is further transmitted on the F2 of the second link.

In one subembodiment, the first radio signal is transmitted on the F2 of the second link.

In one subembodiment, the second radio signal is transmitted on the F2 of the third link.

In one subembodiment, the third radio signal is transmitted on the F2 of the third link.

In one subembodiment, the fourth radio signal is transmitted on the F1 of the third link.

In one subembodiment, the fourth signaling is transmitted on the F1 of the first link.

Embodiment 6

Figure 6:
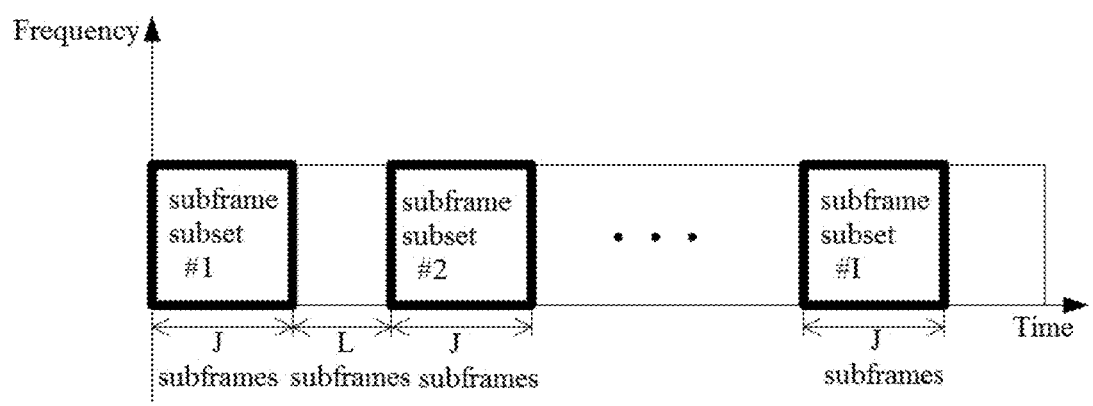
FIG. 6 is a diagram illustrating a first subframe pool according to one embodiment of the present disclosure.

Embodiment 6 illustrates an example of a diagram of a first subframe pool, as shown in FIG. 6. In FIG. 6, bold-line boxes represent a first subframe pool. As shown in FIG. 6, the first subframe pool includes I subframe subsets, and the I subframe subsets are discrete in time domain. The subframe subset includes J consecutive subframes. Adjacent subframe subsets are spaced apart by L subframes. The I is a positive integer, the J is a positive integer greater than 1, and the L is a positive integer not less than 6.

In one subembodiment, the J is related to the bandwidth occupied by the first radio signal.

In one affiliated embodiment of the above subembodiment, the bandwidth occupied by the first radio signal is 3.75 KHz, and the J is not less than 32.

In one affiliated embodiment of the above subembodiment, the bandwidth occupied by the first radio signal is 15 KHz, and the J is not less than 8.

In an example of the affiliated embodiment, the bandwidth occupied by the first radio signal is greater than 15 KHz, and the J is not less than 1.

In one embodiment, the subframes contained in the second subframe group are subframes other than the subframes contained in the first subframe pool.

Embodiment 7

Figure 7:
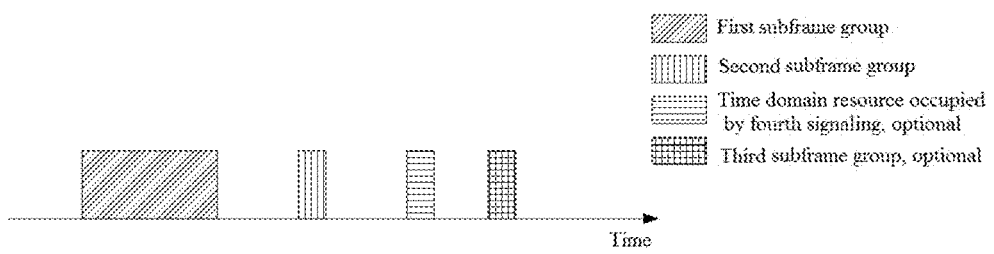
FIG. 7 is a diagram illustrating a time domain relationship among a first subframe group, a second subframe group and a third subframe group according to one embodiment of the present disclosure.

Embodiment 7 illustrates a diagram of a time domain relationship among a first subframe group, a second subframe group and a third subframe group according to the present disclosure, as shown in FIG. 7. In FIG. 7, the box filled by slashes represents time domain resources occupied by the first subframe group; the box filled by vertical lines represents time domain resources occupied by the second subframe group; the box filled by transverse lines represents time domain resources occupied by the fourth signal, which is optional; and the box filled by grids represents time domain resources occupied by the third subframe group, which is optional.

In one subembodiment, the time domain resource occupied by the first subframe group is Y1 subframes, and the Y1 subframes are consecutive in time domain, wherein the Y1 is a positive integer.

In one affiliated embodiment of the above subembodiment, the bandwidth occupied by the first radio signal is 3.75 KHz, and the Y1 is not less than 32.

In one affiliated embodiment of the above subembodiment, the bandwidth occupied by the first radio signal is 15 KHz, and the Y1 is not less than 8.

In an example of the affiliated embodiment, the bandwidth occupied by the first radio signal is greater than 15 KHz, and the Y1 is not less than 1.

In one subembodiment, the time domain resource occupied by the second subframe group is one subframe.

In one subembodiment, the time domain resource occupied by the fourth signal is one subframe.

In one subembodiment, the time domain resource occupied by the third subframe group is one subframe.

Embodiment 8

Figure 8:
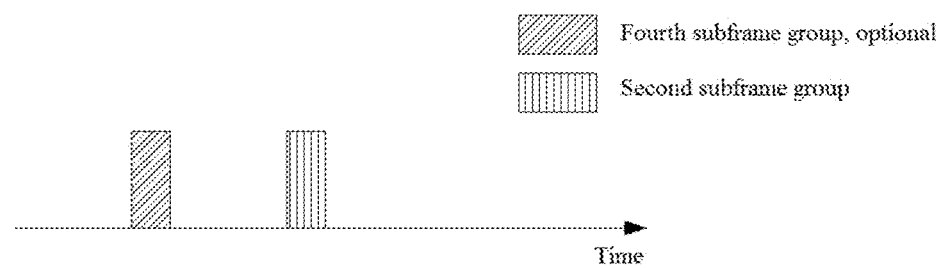
FIG. 8 is a diagram illustrating a time domain relationship between a second subframe group and a fourth subframe group according to one embodiment of the present disclosure.

Embodiment 8 illustrates a diagram of a time domain relationship between a second subframe group and a fourth subframe group according to the present disclosure, as shown in FIG. 8. In FIG. 8, the box filled by slashes represents time domain resources occupied by the fourth subframe group; and the box filled by vertical lines represents time domain resources occupied by the second subframe group.

In one subembodiment, the time domain resource occupied by the second subframe group is one subframe.

In one subembodiment, the time domain resource occupied by the fourth subframe group is one subframe.

Embodiment 9

Figure 9:
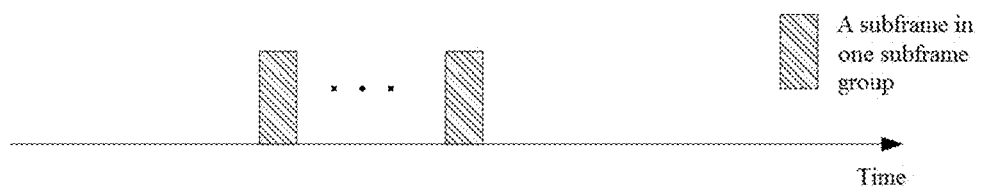
FIG. 9 is a diagram illustrating a subframe group according to one embodiment of the present disclosure.

Embodiment 9 illustrates a diagram of a subframe group according to one embodiment of the present disclosure, as shown in FIG. 9. In FIG. 9, the box filled by slashes represent a subframe in a subframe group.

In one subembodiment, the subframe group is the first subframe group.

In one subembodiment, the subframe group is the second subframe group.

In one subembodiment, the subframe group is the third subframe group.

In one subembodiment, the subframe group is the fourth subframe group.

In one subembodiment, the subframe group is any one subframe group of the K subframe groups.

In one subembodiment, time domain resources occupied by the subframe group is Y2 subframes, wherein the Y2 is a positive integer.

In one affiliated embodiment of the above subembodiment, the Y2 subframes are consecutive.

In one affiliated embodiment of the above subembodiment, the Y2 subframes are discrete.

Embodiment 10

Figure 10:
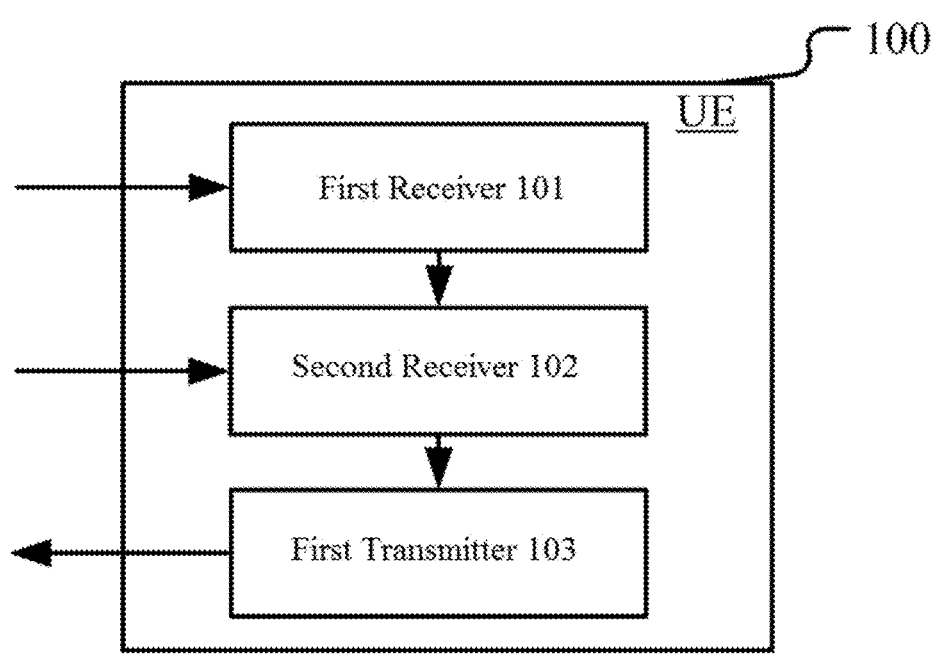
FIG. 10 is a structure block diagram illustrating a processing device in a UE according to one embodiment of the present disclosure.

Embodiment 10 illustrates an example of a structure block diagram of a processing device in a UE, as shown in FIG. 10. In FIG. 10, the processing device 100 in the UE includes a first receiver 101, a second receiver 102, and a first transmitter 103.

The first receiver 101, receiving a first signaling.

The second receiver 102, receiving a first radio signal in a first subframe group.

The first transmitter 103, transmitting a second radio signal in a second subframe group.

In Embodiment 10, the first subframe group includes one or more subframes, and the second subframe group includes one or more subframes. The first signaling is used for determining the first subframe group, and the first signaling is used for determining the second subframe group. The first radio signal is used for determining the second radio signal. A transmitter of the first radio signal is the first node, a receiver of the second radio signal includes the second node, and the first node and the second node are non-co-located. The K is positive integer. The second radio signal includes a first HARQ-ACK, and the first HARQ-ACK indicates whether the first radio signal is correctly decoded. A transmitter of the K radio signals is the first node. Information bits corresponding to the third radio signal include at least one information bit corresponding to the first radio signal and at least one information bit corresponding to the K radio signals. The second radio signal further includes a second HARQ-ACK, and the second HARQ-ACK indicates whether the fourth radio signal is correctly decoded. A transmitter of the fourth radio signal is an equipment other than the first node.

In one subembodiment, the first node receives the first signaling, and the second node transmits the first signaling.

Embodiment 11

Figure 11:
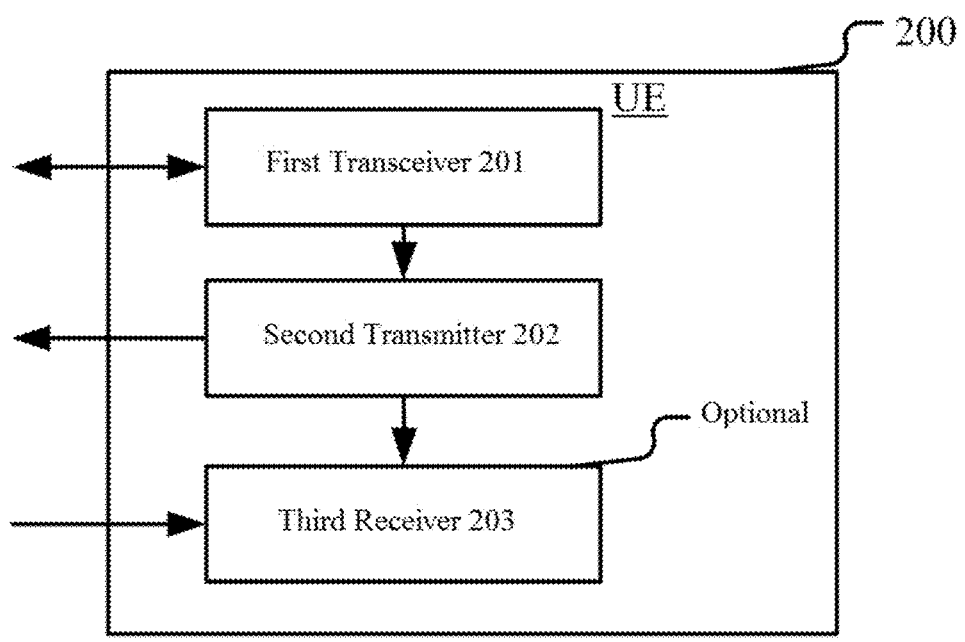
FIG. 11 is a structure block diagram illustrating a processing device in a UE according to another embodiment of the present disclosure.

Embodiment 11 illustrates an example of a structure block diagram of a processing device in another UE, as shown in FIG. 11. In FIG. 11, the processing device 200 in the UE includes a first transceiver 201, a second transmitter 202, and a third receiver 203, wherein the third receiver 203 is optional.

The first transceiver 201, receiving a first signaling, or transmitting a first signaling, or receive a second signaling.

The second transmitter 202, transmitting a first radio signal in a first subframe group.

The third receiver 203, receiving a fourth signaling.

In Embodiment 11, the first subframe group includes one or more subframes, and the second subframe group includes one or more subframes. The first signaling is used for determining the first subframe group, and the first signaling is used for determining the second subframe group. The first radio signal is used for determining the second radio signal. The second radio signal is transmitted in the second subframe group. The UE is the first node, a receiver of the second radio signal includes the second node, and the first node and the second node are non-co-located. A transmitter of the second radio signal is a receiver of the first radio signal. The K is positive integer. The second radio signal includes a first HARQ-ACK, and the first HARQ-ACK indicates whether the first radio signal is correctly decoded. At least one information bit corresponding to the first radio signal and at least one information bit corresponding to the K radio signals are mapped to a third radio signal. The third radio signal is transmitted in a third subframe group. A transmitter of the third radio signal is a receiver of the K radio signals. The receiving start time of the fourth signaling is behind the transmitting end time of the first radio signal. The fourth signaling includes a HARQ-ACK for the first radio signal; or the fourth signaling includes at least a first ID between a first ID and a HARQ process number for the first radio signal, and the first ID indicates whether data scheduled by the fourth signaling is new data. A transmitter of the fourth signaling and the receiver of the first radio signal are non-co-located.

In one subembodiment, the first node transmits the first signaling.

Embodiment 12

Figure 12:
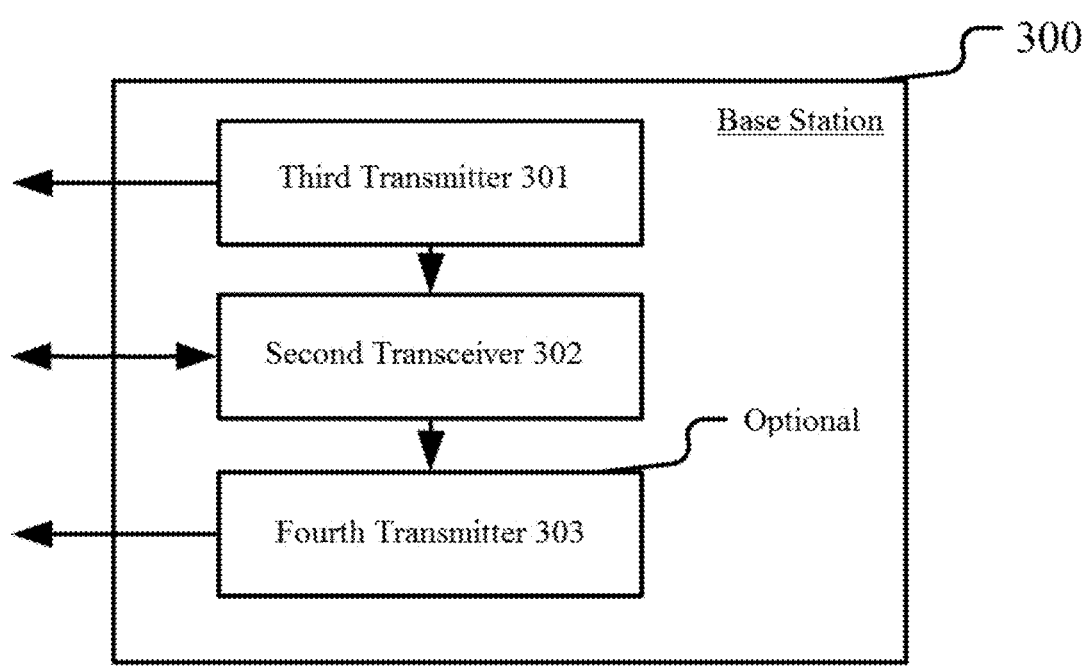
FIG. 12 is a structure block diagram illustrating a processing device in a base station according to one embodiment of the present disclosure.

Embodiment 12 illustrates an example of a structure block diagram of a processing device in a base station device, as shown in FIG. 12. In FIG. 12, the processing device 300 in the base station device includes a third transmitter 301, a second transceiver 302, and a fourth transmitter 303.

The third transmitter 301, transmitting a first signaling, wherein the first signaling is used for determining a first subframe group and the first signaling is used for determining a second subframe group; or transmitting a second signaling, wherein the second signaling is used for determining a first subframe group and the second signaling is used for determining a second subframe group; or transmitting a third signaling, wherein the third signaling includes scheduling information and the first signaling includes the scheduling information included in the third signaling.

The second transceiver 302, receiving a second radio signal in the second subframe group.

The fourth transmitter 303, transmitting a fourth signaling.

In Embodiment 12, the first subframe group includes one or more subframes, and the second subframe group includes one or more subframes. The second radio signal is related to the first radio signal. The first radio signal is transmitted in the first subframe group. A transmitter of the first radio signal is the first node, the base station is the second node, and the first node and the second node are non-co-located. The third signaling includes scheduling information, and the first signaling includes the scheduling information included in the third signaling. The scheduling information includes at least one among information relevant to the first subframe group, frequency domain resources occupied by the first radio signal in the first subframe group, an MCS for the first radio signal, an RV for the first radio signal, a HARQ process number for the first radio signal, and an NDI for the first radio signal. Information bits corresponding to the third radio signal includes at least one information bit corresponding to the first radio signal and at least one information bit corresponding to the K radio signals. The K radio signals are transmitted in K subframe groups respectively. The K is a positive integer. The second radio signal includes a first HARQ-ACK, and the first HARQ-ACK indicates whether the first radio signal is correctly decoded. A transmitter of the K radio signal is the first node. The second radio signal further includes a second HARQ-ACK, and the second HARQ-ACK indicates whether the fourth radio signal is correctly decoded. The receiving start time of the fourth signaling is behind the transmitting end time of the first radio signal. The fourth signaling includes a HARQ-ACK for the first radio signal; or the fourth signaling includes at least a first ID of a first ID and a HARQ process number for the first radio signal, and the first ID indicates whether data scheduled by the fourth signaling is new data. The base station and a receiver of the first radio signal are non-co-located.

In one subembodiment, the second node transmits the second signaling and the fourth signaling.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to REID, IOT terminals, Machine Type Communication (MTC) terminals, wearable devices, vehicle communication equipment, wireless sensors, Internet cards, mobile phones, tablet computers, notebooks and other wireless communication equipment. The base station and base station device in the present disclosure include but not limited to macro-cellular base stations, micro-cellular base stations, home base stations, relay base station and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for relay communication, comprising:
    receiving a first signaling;
    receiving a first radio signal in a first subframe group;
    transmitting a second radio signal in a second subframe group;
    wherein the first subframe group comprises one or more subframes, and the second subframe group comprises one or more subframes; the first signaling is used for determining the first subframe group, and the first signaling is used for determining the second subframe group; the first radio signal is used for determining the second radio signal; a transmitter of the first radio signal is a first node, a receiver of the second radio signal comprises a second node, and the first node and the second node are non-co-located; and the second radio signal comprises a first Hybrid Automatic Repeat reQuest Acknowledgement (HARQ-ACK), and the first HARQ-ACK indicates whether the first radio signal is correctly decoded;
    receiving K radio signals in K subframe groups; and
    transmitting a third radio signal in a third subframe group;
    wherein the K is a positive integer, the third subframe group comprises one or more subframes, any one subframe group of the K subframe groups comprises one or more subframes, a transmitter of the K radio signals is the first node, and information bits corresponding to the third radio signal comprise at least one information bit corresponding to the first radio signal and at least one information bit corresponding to the K radio signals.

2. The method according to claim 1, comprising:
    receiving a fourth radio signal in a fourth subframe group;

wherein the fourth subframe group comprises one or more subframes, the second radio signal comprises the first HARQ-ACK and a second HARQ-ACK, and the second HARQ-ACK indicates whether the fourth radio signal is correctly decoded; and a transmitter of the fourth radio signal is an equipment other than the first node.

3. The method according to claim 1, wherein the first signaling indicates explicitly at least one of the first subframe group and frequency domain resources occupied by the first radio signal in the first subframe group; or, the first signaling indicates implicitly at least one of the second subframe group and frequency domain resources occupied by the second radio signal in the second subframe group; or, the first signaling is used for determining a first subframe pool, the first subframe pool includes a positive integer number of subframes, the subframes in the first subframe group all belong to the first subframe pool, and the positions of the subframes contained in the first subframe group in the first subframe pool are predefined.

4. A method in a UE for relay communication, comprising:
receiving a first signaling, or transmitting a first signaling, or receiving a second signaling; and
transmitting a first radio signal in a first subframe group;
wherein the first subframe group comprises one or more subframes, and the second subframe group comprises one or more subframes; the first signaling is used for determining the first subframe group, and the first signaling is used for determining the second subframe group; the second signaling is used for determining the first subframe group, and the second signaling is used for determining the second subframe group; the first radio signal is used for determining the second radio signal; the second radio signal is transmitted in the second subframe group; the UE is a first node, a receiver of the second radio signal comprises a second node, and the first node and the second node are non-co-located; a transmitter of the second radio signal is a receiver of the first radio signal; and the second radio signal comprises a first HARQ-ACK, and the first HARQ-ACK indicates whether the first radio signal is correctly decoded;
receiving a third signaling;
wherein the UE transmits the first signaling; the third signaling comprises scheduling information, and the first signaling comprises the scheduling information included in the third signaling; and the scheduling information comprises at least one among information relevant to the first subframe group, frequency domain resources occupied by the first radio signal in the first subframe group, a Modulation and Coding Scheme of the first radio signal, a Redundancy Version of the first radio signal, a HARQ process number for the first radio signal, and a New Data Indicator for the first radio signal.

5. The method according to claim 4, comprising:
transmitting K radio signals in K subframe groups; or receiving a fourth signaling, and determining whether the first radio signal is correctly decoded according to the fourth signaling;
wherein the K is a positive integer; any one subframe group of the K subframe groups comprises one or more subframes; at least one information bit corresponding to the first radio signal and at least one information bit corresponding to the K radio signals are mapped to a third radio signal; the third radio signal is transmitted in a third subframe group; a transmitter of the third radio signal is a receiver of the K radio signals; receiving start time of the fourth signaling is behind transmitting end time of the first radio signal, and the fourth signaling comprises a HARQ-ACK for the first radio signal; or the fourth signaling comprises at least a first ID between a first ID and a HARQ process number for the first radio signal, and the first ID indicates whether data scheduled by the fourth signaling is new data; and a transmitter of the fourth signaling and a receiver of the first radio signal are non-co-located.

6. A method in a base station for relay communication, comprising:
transmitting a first signaling, wherein the first signaling is used for determining a first subframe group, and the first signaling is used for determining a second subframe group; or transmitting a second signaling, wherein the second signaling is used for determining a first subframe group, and the second signaling is used for determining a second subframe group; or transmitting a third signaling, wherein the third signaling comprises scheduling information, and the first signaling comprises the scheduling information included in the third signaling; and
receiving a second radio signal in the second subframe group;
wherein the first subframe group comprises one or more subframes, and the second subframe group comprises one or more subframes; the second radio signal is related to a first radio signal; the first radio signal is transmitted in the first subframe group; a transmitter of the first radio signal is a first node, the base station is a second node, and the first node and the second node are non-co-located; the scheduling information comprises at least one among information relevant to the first subframe group, frequency domain resources occupied by the first radio signal in the first subframe group, an MCS (Modulation and Coding Scheme) for the first radio signal, an RV (Redundancy Version) for the first radio signal, a HARQ (Hybrid Automatic Repeat reQuest) process number for the first radio signal, and an NDI (New Data Indicator) for the first radio signal; and the second radio signal comprises a first HARQ-ACK, and the first HARQ-ACK indicates whether the first radio signal is correctly decoded;
receiving a third radio signal in a third subframe group; or transmitting a fourth radio signal in a fourth subframe group;
wherein the third subframe group comprises one or more subframes, information bits corresponding to the third radio signal comprise at least one information bit corresponding to the first radio signal and at least one information bit corresponding to K radio signals; the K radio signals are transmitted in K subframe groups respectively; the K is a positive integer; a transmitter of the K radio signal is the first node; and the fourth subframe group comprises one or more subframes, the second radio signal comprises the first HARQ-ACK and a second HARQ-ACK, and the second HARQ-ACK indicates whether the fourth radio signal is correctly decoded.

7. The method according to claim 6, comprising:
transmitting a fourth signaling;
wherein the second radio signal is used for determining the fourth signaling; receiving start time of the fourth signaling is behind transmitting end time of the first radio signal; the fourth signaling comprises a HARQ- ACK for the first radio signal; or the fourth signaling comprises at least a first ID between a first ID and a HARQ process number for the first radio signal, and the first ID indicates whether data scheduled by the fourth signaling is new data; the base station and a receiver of the first radio signal are non-co-located; or the first signaling indicates implicitly at least one of the second subframe group and frequency resources occupied by the second radio signal in the second subframe group.

8. A UE for relay communication, comprising:
a first receiver, receiving a first signaling;
a second receiver, receiving a first radio signal in a first subframe group; and
a first transmitter, transmitting a second radio signal in a second subframe group;
wherein the first subframe group comprises one or more subframes, and the second subframe group comprises one or more subframes; the first signaling is used for determining the first subframe group, and the first signaling is used for determining the second subframe group; the first radio signal is used for determining the second radio signal; a transmitter of the first radio signal is a first node, a receiver of the second radio signal comprises a second node, and the first node and the second node are non-co-located; and the second radio signal comprises a first HARQ-ACK, and the first HARQ-ACK indicates whether the first radio signal is correctly decoded;
wherein the second receiver receives K radio signals in K subframe groups, and the first transmitter transmits a third radio signal in a third subframe group; the K is a positive integer; and, the third subframe group comprises one or more subframes, any one subframe group of the K subframe groups comprises one or more subframes, a transmitter of the K radio signals is the first node, and information bits corresponding to the third radio signal comprise at least one information bit corresponding to the first radio signal and at least one information bit corresponding to the K radio signals.

9. The UE according to claim 8, wherein the first receiver receives a fourth radio signal in a fourth subframe group; the fourth subframe group comprises one or more subframes, the second radio signal comprises the first HARQ-ACK and a second HARQ-ACK, and the second HARQ-ACK indicates whether the fourth radio signal is correctly decoded; and a transmitter of the fourth radio signal is an equipment other than the first node.

10. The UE according to claim 8, wherein the first signaling indicates explicitly at least one of the first subframe group and frequency domain resources occupied by the first radio signal in the first subframe group; or, the first signaling indicates implicitly at least one of the second subframe group and frequency domain resources occupied by the second radio signal in the second subframe group; or, the first signaling is used for determining a first subframe pool, the first subframe pool includes a positive integer number of subframes, the subframes in the first subframe group all belong to the first subframe pool, and the positions of the subframes contained in the first subframe group in the first subframe pool are predefined.

11. A UE for relay communication, comprising:
a first transceiver, receiving a first signaling, or transmitting a first signaling, or receiving a second signaling; and
a second transmitter, transmitting a first radio signal in a first subframe group;
wherein the first subframe group comprises one or more subframes, and the second subframe group comprises one or more subframes; the first signaling is used for determining the first subframe group, and the first signaling is used for determining the second subframe group; the second signaling is used for determining the first subframe group, and the second signaling is used for determining the second subframe group; the first radio signal is used for determining the second radio signal; the second radio signal is transmitted in the second subframe group; the UE is a first node, a receiver of the second radio signal comprises a second node, and the first node and the second node are non-co-located; a transmitter of the second radio signal is a receiver of the first radio signal; and the second radio signal comprises a first HARQ-ACK, and the first HARQ-ACK indicates whether the first radio signal is correctly decoded;
wherein the first transceiver further receives a third signaling; the UE transmits the first signaling; the third signaling comprises scheduling information, and the first signaling comprises the scheduling information included in the third signaling; and the scheduling information comprises at least one among information relevant to the first subframe group, frequency domain resources occupied by the first radio signal in the first subframe group, an MCS for the first radio signal, an RV for the first radio signal, a HARQ process number for the first radio signal, and an NDI for the first radio signal.

12. The UE according to claim 11, wherein the second transmitter further transmits K radio signals in K subframe groups; or the UE further comprises a third receiver, and the third receiver receives a fourth signaling, and assumes, according to the fourth signaling, whether the first radio signal is correctly decoded; the K is a positive integer; any one subframe group of the K subframe groups comprises one or more subframes; at least one information bit corresponding to the first radio signal and at least one information bit corresponding to the K radio signals are mapped to a third radio signal; the third radio signal is transmitted in a third subframe group; a transmitter of the third radio signal is a receiver of the K radio signals; receiving start time of the fourth signaling is behind transmitting end time of the first radio signal, and the fourth signaling comprises a HARQ-ACK for the first radio signal; or the fourth signaling comprises at least a first ID between a first ID and a HARQ process number for the first radio signal, and the first ID indicates whether data scheduled by the fourth signaling is new data; and a transmitter of the fourth signaling and a receiver of the first radio signal are non-co-located.

13. A base station for relay communication, comprising:
a third transmitter, transmitting a first signaling, wherein the first signaling is used for determining a first subframe group, and the first signaling is used for determining a second subframe group; or transmitting a second signaling, wherein the second signaling is used for determining a first subframe group, and the second signaling is used for determining a second subframe group; or transmitting a third signaling, wherein the third signaling comprises scheduling information, and the first signaling comprises the scheduling information included in the third signaling; and
a second transceiver, receiving a second radio signal in the second subframe group;
wherein the first subframe group comprises one or more subframes, and the second subframe group comprises one or more subframes; the second radio signal is related to a first radio signal; the first radio signal is transmitted in the first subframe group; a transmitter of the first radio signal is a first node, the base station is a second node, and the first node and the second node are non-co-located; the scheduling information comprises at least one among information relevant to the first subframe group, frequency domain resources occupied by the first radio signal in the first subframe group, an MCS Modulation and Coding Scheme) for the first radio signal, an RV (Redundancy Version) for the first radio signal, a HARQ (Hybrid Automatic Repeat reQuest) process number for the first radio signal, and an NDI (New Data Indicator) for the first radio signal; and the second radio signal comprises a first HARQ-ACK, and the first HARQ-ACK indicates whether the first radio signal is correctly decoded;

wherein the second transceiver further receives a third radio signal in a third subframe group; or the second transceiver further transmits a fourth radio signal in a fourth subframe group; the third subframe group comprises one or more subframes, information bits corresponding to the third radio signal comprise at least one information bit corresponding to the first radio signal and at least one information bit corresponding to K radio signals; the K radio signals are transmitted in K subframe groups respectively; the K is a positive integer; a transmitter of the K radio signal is the first node; and the fourth subframe group comprises one or more subframes, the second radio signal comprises the first HARQ-ACK and a second HARQ-ACK, and the second HARQ-ACK indicates whether the fourth radio signal is correctly decoded.

14. The base station according to claim 13, further comprising a fourth transmitter; wherein the fourth transmitter transmits a fourth signaling; the second radio signal is used for determining the fourth signaling; receiving start time of the fourth signaling is behind transmitting end time of the first radio signal; the fourth signaling comprises a HARQ-ACK for the first radio signal; or the fourth signaling comprises at least a first ID between a first ID and a HARQ process number for the first radio signal, and the first ID indicates whether data scheduled by the fourth signaling is new data; the base station and a receiver of the first radio signal are non-co-located; or the first signaling indicates implicitly at least one of the second subframe group and frequency resources occupied by the second radio signal in the second subframe group.

\* \* \* \* \*